April 21, 1942.                R. ULLMAN                2,280,459
                         MEASURING INSTRUMENT
                         Filed Feb. 1, 1940            2 Sheets—Sheet 2
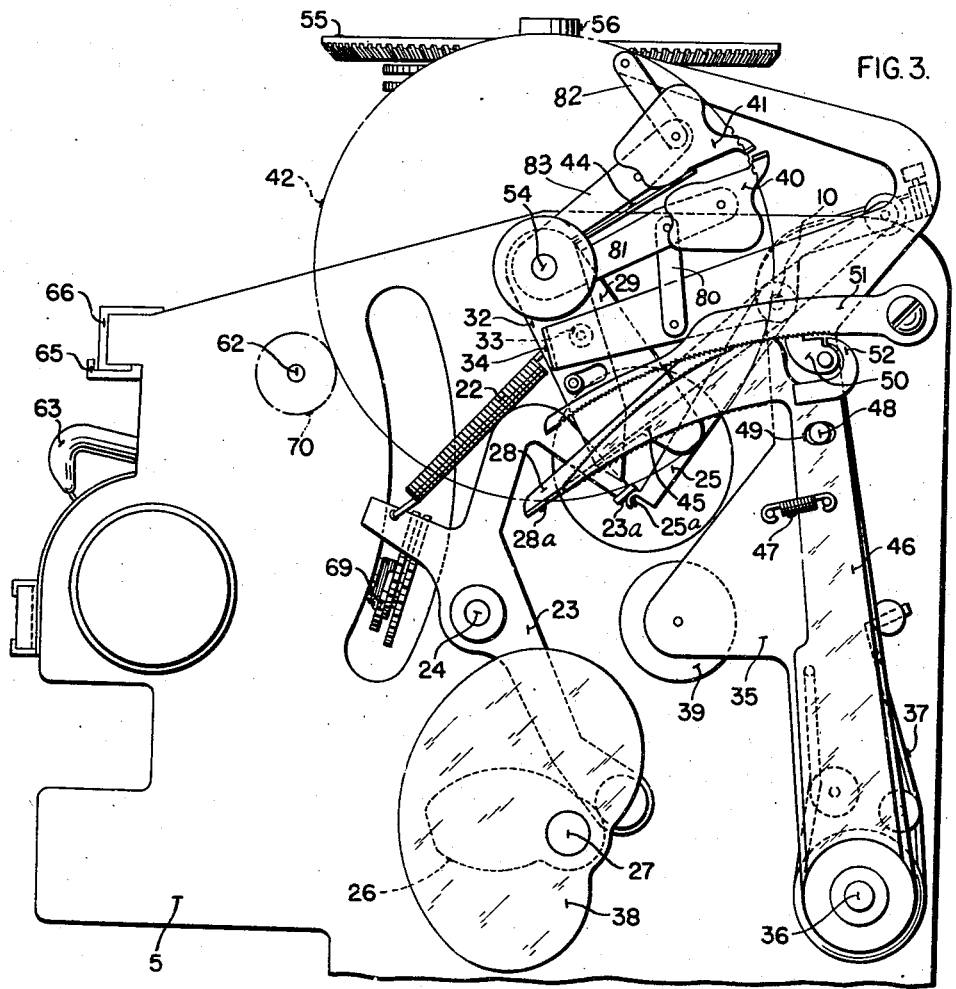
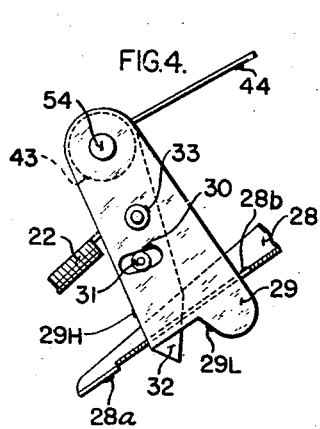
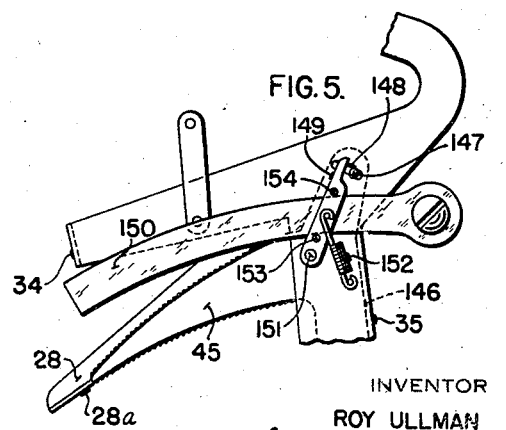
INVENTOR
ROY ULLMAN
BY George M. Ullman
ATTORNEY Patented Apr. 21, 1942

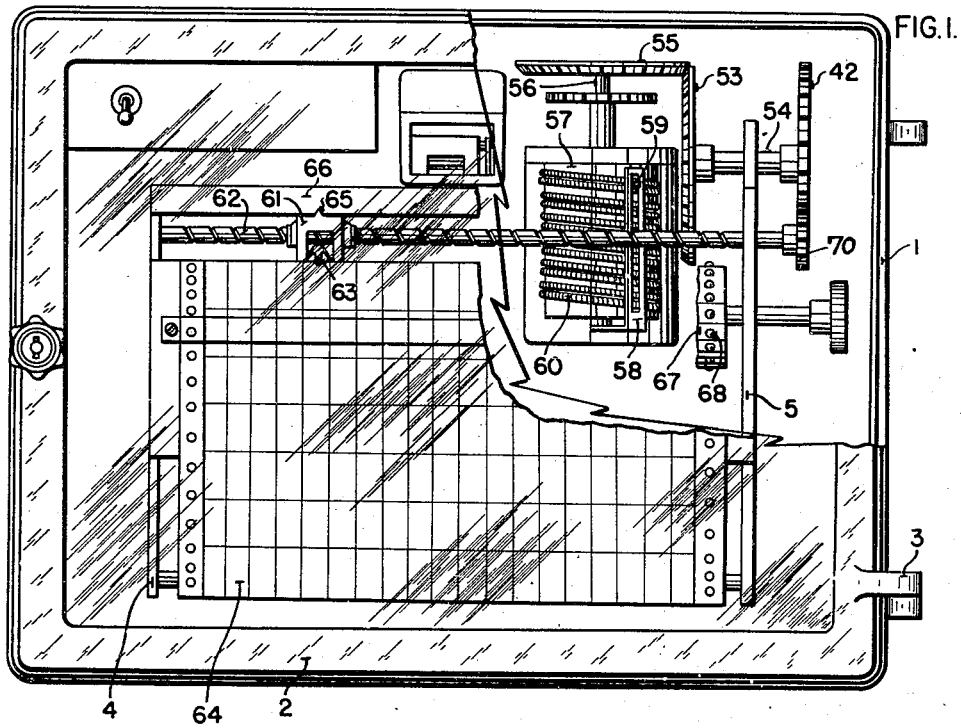

2,280,459

UNITED STATES PATENT OFFICE 2,280,459

MEASURING INSTRUMENT

Roy Ullman, Roslyn, Pa., assignor to The Brown Instrument Company, Philadelphia, Pa., a corporation of Pennsylvania Application February 1, 1940, Serial No. 316,743

8 Claims. (Cl. 74—1)

The present invention relates to measuring instruments and particularly to measuring instruments of the self balancing potentiometric type that may have recording, indicating or controlling provisions, or more usually all three.

In instruments of this type the voltage of a thermocouple, which is subjected to a temperature to be measured, is impressed on a galvanometer in opposition to a known voltage. A contact in the thermocouple circuit is then moved along a resistance across which the known voltage is impressed until the known voltage and the unknown voltage of the thermocouple are equal, at which time the galvanometer pointer is in its neutral position. The position of the contact is then indicative of the value of the temperature to which the thermocouple is subjected. Various means have been provided in the prior art to measure the deflection of the galvanometer pointer and position the contact in accordance therewith. These means, however, have often had disadvantages such as lack of accuracy or sensitivity or have been too complicated or cumbersome.

It is an object of my present invention to provide a simple and accurate mechanism for rebalancing a potentiometer in response to unbalance thereof.

It is a further object of my invention to provide a novel mechanism for detecting the amount and direction of galvanometer deflection and adjusting the contact along the resistance in response thereto. It is a further object of my invention to actuate a relay mechanism to rebalance a potentiometer and simultaneously move a pen across a chart to record and exhibit the value of the temperature being measured.

While I describe my invention herein as being used in the measurement and recording of temperature it is obvious that an instrument such as this may be used to measure and record the values of various other conditions.

The various features of novelty which characterize my invention are pointed out with particularity in the claims annexed to and forming a part of this specification. For a better understanding of the invention, however, its advantages and specific objects obtained with its use, reference should be had to the accompanying drawings and descriptive matter in which I have illustrated and described a preferred embodiment of the invention.

In the drawings:

Fig. 1 is a front view of the potentiometer with various parts broken away and some omitted for the sake of clearness;

Fig. 2 is a perspective view of certain operating parts of my potentiometer;

Fig. 3 is an outside view of the right-hand side plate of the potentiometer;

Fig. 4 is a detail view of the secondary pointer and the selecting means; and

Fig. 5 is a view of a modified form of brake.

The recording potentiometer instrument shown herein includes a galvanometer, the pointer of which deflects in response to a condition of unbalance in a potentiometer measuring circuit which may be of any usual or suitable form including a resistance which may be adjustable to rebalance the potentiometer. The instrument also comprises mechanical relay provisions operated by a constantly rotating driving motor and controlled by the deflection of the galvanometer pointer away from a zero position, which periodically tends to rebalance the potentiometer circuit and move a pen or other recording carriage along a travelling record strip to record the varying value of the quantity measured on said strip. The relay may also, if desired, be used to actuate any suitable control provisions.

The mechanism of the instrument is housed in a casing 1 that is provided with a door 2, hinged at 3. Pivotally mounted in the usual manner in this casing is a support having attached thereto side plates 4 and 5 between and upon which the instrument mechanism is mounted. The instrument is provided with a galvanometer 6 having a pointer 7 that deflects in response to potentiometer unbalance. The rebalancing of the potentiometer circuit in response to variations in the quantity measured, as indicated by deflections of the pointer 7, is carried out by mechanism including a pointer engaging element 8. The latter is pivoted on a shaft 9 and in connection with a shaft 10 has a pivoted tendency that may be due partly to gravity and partly to a spring to move clockwise in Figure 2 into engagement with the pointer 7. The horizontal arm of element 8 engages with one end of a lever 11, pivoted at 12 on a supporting frame 13. The other end of this lever is engaged by a pin 14 that is adjustable in some conventional manner to different positions in a slot formed in a lever 15 that is journalled on the shaft 10. Movement of the shaft 10 is imparted, through a portion of its range, to the lever 15 by means of a connecting spring 16 between the lever 15 and an arm 17 that is attached to the shaft. The pointer 7 is periodically clamped in position by a yoke shaped clamping member 18, pivoted at 19 on the frame 13. This member is biased upwardly into clamping position and moved downwardly to free the pointer by engagement between an arm 20 that is attached to shaft 10 and a projection 21 attached to the clamping member 18. A spring 22 tends to hold a rocker 23, which is journalled on a pivot 24, in a position in which the rocker engages an arm 25 secured to the shaft 10 and thereby holds the later in a position in which the pointer is unclamped and the feeler 8 is moved counter-clockwise or to the left end of its path of travel.

A cam 26 which is carried by a constantly rotating shaft 27 driven by the instrument driving motor (not shown) turns the rocker 23 around its pivot against the action of spring 22, which thereby moves the edge 23a of the rocker 23 from the projection 25a of the arm 25 to permit the latter to turn to the position shown in Figure 2 with feeler 8 in engagement with the pointer 7. Therefore, the arm 25 will be moved to different positions for different deflective positions of the pointer. When the arm 25 turns counter-clockwise in Figure 2 the projection engages and moves a secondary pointer 28, free of shaft 10, into a position corresponding to that of the pointer 7.

At the end of each angular adjustment of secondary pointer 28 one of the shoulders $29^L$ or $29^H$ of a member 29 engages the bottom wall of a slot 28b in the member 28. A brake member 32 is given a tendency to move into engagement with the opening 28b by the spring 22, but is periodically held out of said engagement by the action on its pin 31 by the left edge of slot 30 as shown in Figure 4. The member 29 also has a tendency to move into engagement with the slot 28b, but is periodically moved out of such engagement by the action on its projection 33 by a projection 34 on a lever 35 pivoted at 36. Upon return movement the brake 32 first clamps 28 to hold it in place and then member 29 moves until the edge of the opening 28b is engaged by either shoulder $29^L$ or $29^H$. When the pointer 7 has deflected to the right in Figure 2, as it does when the actual value of the quantity measured is higher than that indicated by the previously made and still existing potentiometer measurement, the secondary pointer is engaged and locked by the brake 32 and is engaged by shoulder $29^H$. When the pointer 7 deflects to the left, as it will for a decrease in the quantity measured, the shoulder $29^L$ will engage the secondary pointer.

A spring 37 gives the lever 35 a tendency to turn in a clockwise direction in Figure 2, or a counter-clockwise direction in Figure 3, but throughout the major portion of each rotation of the shaft 27 is held in a retracted position by a cam 38 on the said shaft that is engaged by a cam roller 39 on the lever. The ratchet lever 35 is formed at its upper end with a V-shaped portion, the diverging sides of which extend toward the left in Figure 3. One of the side portions is connected by a link 80 with the outer end of an arm 81 that is pivoted on shaft 54. In a similar manner, the other side of the V is connected by a link 82 with an arm 83 that is also pivoted on shaft 54. It will therefore be seen that as the lever 35 moves counter-clockwise in Figure 3 the outer ends of arms 82 and 83 will move in the arc of a circle around the shaft 54, said outer ends moving apart. Pawls 40 and 41 are pivotally mounted, respectively, on the outer ends of arms 81 and 83. These pawls are so formed that they have a gravity bias out of engagement with the teeth of a ratchet gear wheel 42, that is attached to the shaft 54, but one or the other of the pawls is brought into engagement with the wheel on each forward or clockwise movement of the lever 35.

The position assumed by the part 29 when in engagement with the secondary pointer 28, controls the action of the pawls 40 and 41 by virtue of the fact that a collar or hub portion 43, of the part 29, carries a spring pawl engaging arm 44. The movement of the part 29 into a position in which its shoulder $29^L$ engages the edge of opening 28b causes the arm 44 to move the pawl 40 into operative engagement with the teeth of wheel 42. Clockwise or forward movement of the ratchet lever 35 then gives a counter-clockwise movement in Figure 2 (clockwise in Fig. 3), to the wheel 42. Conversely, when shoulder $29^H$ engages secondary pointer 28, the arm 44 moves pawl 41 into operative engagement with wheel 42 to give the latter a clockwise movement in Fig. 2.

The extent of the adjustment then given the wheel 42 will depend upon the point of engagement between an extension 28a on the secondary pointer 28 and either the upper or lower serrated edges of a curved extension 45 on a lever 46 that is also pivoted on shaft 36 and normally moves with the lever 35. The lever 46 is biased counter-clockwise (Fig. 3) with respect to lever 35 by a spring 47 until a pin 48 on lever 35 engages the right end of a slot 49 in the lever 46. The two levers normally move together in this relation until the extension 45 engages arm 28a, at which time lever 46 stops and permits a brake 50, carried by lever 35, to be applied to the brake surface of an arm 51 fixed to side plate 5. This stops the lever 35 and parts driven thereby.

The brake 50 has a serrated edge as shown and is spring biased in a clockwise direction so that it tends to engage the serrated brake edge of arm 51, which edge is concentric with the path of movement of brake 50. An extension 52 of lever 46, however, normally bears against the brake above its pivot and thereby holds the brake out of engagement with the brake surface 51. This is due to the fact that spring 47 normally keeps lever 46, relative to lever 35, to the left of the position shown in Figure 3 so that extension 52 engages the brake 50. As the surface of cam 38 recedes from roller 39 levers 35 and 46 will move forwardly until the extension 45 engages the arm 28a of the secondary pointer. At this time lever 46 will be stopped and as lever 35 continues to move the brake 50 will turn under its bias to engage the brake surface 51 to stop lever 35. The relative movement of levers 46 and 35 at this time is very slight so that the lever 35 stops at practically the same instant as the lever 46. Pawl 40 or 41 will therefore move the wheel 42 only a distance dependent upon the movement of lever 35. As the cam 38 starts to move lever 35 clockwise in Figure 3 the spring 47 will hold lever 46 until extension 52 has engaged and released the brake, at which time pin 48 will start to move lever 46. There must be some overtravel of the levers 35 and 46 clockwise in Figure 3 beyond the point at which the extreme edge of extension 45 would engage arm 28a in order to release the brake when the arm and edge are engaged in the neutral position of the secondary pointer. This overtravel will, however, have no effect on the driving of gear 42 by the pawls 40 or 41 since the amount of the overtravel is necessary to bring the pawls into driving engagement with the gear.

The larger the deflection of the galvanometer pointer 7 the higher or lower, in Figure 3, the arm 28a will be with respect to the end of the extension 45 and, therefore, the greater the arc through which lever 35 may be moved before it is stopped by engagement of extension 45 with arm 28a.

The rotation of wheel 42 in one direction or the other effects corresponding potentiometer rebalancing adjustments, and adjustments of a recorder carriage. The rebalancing adjustments are effected by means of a gear 53 on a shaft 54 to which the gear 42 is attached and upon which the collar 43 is journalled. The gear 53 drives a gear 55 on a shaft 56 that is journalled in a potentiometer resistance supporting element 57. The lower end of shaft 56 carries an angularly shaped contact supporting member 58 that is provided with a slot in which a contact 59 may move up and down as it is rotated around the support 57. A potentiometer slide wire 60 is helically wrapped around the support 57 and as shaft 56 is rotated the contact 59 will be moved in a helical path to vary the resistance in the potentiometer circuit. The resistance adjustment made in response to a deflection of the galvanometer pointer in one direction away from its neutral position tends to rebalance the potentiometer circuit and thereby tends to return the galvanometer pointer to its neutral position.

The rotation of wheel 42 in one direction or the other also serves to adjust an indicating and recording carriage 61 to a position corresponding to the value of the condition being measured. The carriage 61 is guided in a suitable manner in the framework of the instrument and is journalled on a helically threaded shaft 62 and is provided with a lug engaging the thread of the shaft so that the carriage will be moved back and forth between the side plates 4 and 5 of the instrument as the shaft rotates. The carriage 61 carries a pen 63 which is adapted to make a record line on a chart 64, and is provided with an indicating pointer 65 that cooperates with a channel member 66 extending between the side plates and upon which a scale may be printed. The chart 64 passes over a roller 67 provided with driving pins 68 engaging perforations in the chart, which roller is driven by a ratchet mechanism, indicated generally at 69, from the rocker 23.

Shaft 62 extends beyond the side plate 5 and has attached to its outer end a gear 70 that meshes with the large gear 42. Therefore, as the gear 42 is rotated the shaft 62 will be rotated to shift the pen carriage across the chart to various positions corresponding to the value of the condition being measured.

In summarizing the operation of the instrument it will be seen that the lever 23 periodically moves arm 25 clockwise in Figure 2 to unclamp the pointer 7 and move the feeler 8 to the left out of its path. If the feeler should reach the limit of its travel prior to the end of the travel of arm 25 the spring 16 will give and the arm 17 will move idly. As shaft 27 rotates to bring the high portion of cam 26 under the cam roller of lever 23, the feeler 8 and arm 25 and their connecting parts will reverse their diection of movement and will be stopped when the feeler contacts the pointer 7. This positively positions arm 25 at some definite point with respect to the deflection of pointer 7. For purposes of sensitivity adjustment, however, this position may be changed by shifting the pin 14 along the slot in lever 15, thereby changing the leverage between the feeler 8 and arm 25.

Just prior to the time arm 25 is moved to its new position the cam 38 has moved lever 35 counter-clockwise in Figure 2 (clockwise in Fig. 3) and the projection 34 on that lever has engaged pin 33 to move member 29 and brake 32 to free the secondary pointer 28. The secondary pointer 28 may then be moved by arm 25 to a position corresponding to that of pointer 7. Thereafter as lever 35 moves clockwise in Figure 2 (counter-clockwise in Fig. 3) the brake 32 will lock the secondary pointer in position by its engagement with the edge of opening 28b and selector member 29 will move either step $29^L$ or $29^H$ into engagement with the edge of opening 28b. This through collar 43, attached to 29, and finger 44 will engage and move either pawl 40 or 41 around its pivot into driving engagement with gear 42.

Continued movement of lever 35 carrying lever 46 with it will sooner or later bring extension 45 into engagement with the arm 28a of the secondary pointer. Because of the serrated edge surfaces of this extension 45 the lever 46 will be instantly stopped upon engagement with 28a and the extension 52 of the lever 46 will permit brake 50, carried by lever 35, to turn under its bias and engage the brake surface of arm 51 and stop the movement of lever 35. If the secondary pointer arm 28a is positioned in the path of the end of extension 45, as it will when the galvanometer pointer is in its neutral position, the lever 35 will be stopped before it has imparted any rotative movement to the gear 42. If the galvanometer pointer 7 is deflected on either side of its neutral position, the arm 28a will then be positioned a corresponding amount above or below the end of extension 45. The lever 35 will therefore be permitted to have a greater forward movement before it is stopped with a consequent movement of gear 42 by one of the pawls 40 or 41.

If it is found desirable this instrument may be equipped with a lost motion connection between the shaft 62 and the gear 42 and the instrument caused to cycle around the neutral point in a manner fully disclosed in my copending application Serial No. 316,589, filed January 31, 1940, the details of which form no part of the invention herein. The addition of such mechanism will render the instrument of this application even more accurate than it inherently is, when used for the measurement of various conditions through a narrow range.

It will be clear from the above description that I have made an instrument that is capable of accurately measuring the deflection of the galvanometer pointer and quickly and accurately rebalancing the potentiometer and adjusting the pen in accordance with such deflection.

In the description above I have disclosed the use of a ratchet type of brake for the lever 35. Other types of brakes may be used if desired and an example in the form of a friction brake is shown in Figure 5. In this embodiment a lever 146, similar to lever 46 in Figure 3, is pivoted on the shaft 36, but in this case it is inside instead of outside of the lever 35. The lever 146 is provided with a pin 147 that extends through a slot 148 in the lever 35 to engage the upper end of a brake member 149 pivoted on that lever to hold the brake out of engagement with a member 150. This brake is pivoted at 151 and is biased by a spring 152 to bring its braking pins 153 and 154 into engagement with the edges of the member 150. The lever 146 is normally biased counter-clockwise with respect to lever 35 by a spring (not shown) in a manner similar to the manner in which spring 47 acts on lever 46.

In operation when the lever 35 is moved to the right in Figure 5, the lever 146 will lag behind until pin 147 has moved to the left of slot 148 and in so doing has moved the pins 153 and 154 out of coming engagement with the member 150. Thereafter the levers 35 and 146 will be moved together. Levers 35 and 146 start to the left in Figure 5 as a unit and this continues until the extension 45 engages arm 28a of the secondary pointer, at which time 146 is stopped. Spring 152 will then move the member 149 to bring pins 153 and 154 into camming engagement with member 159 to stop lever 35. The potentiometer circuit is thus balanced and pen 63 is shifted to the correct position along the chart.

While in accordance with the provisions of the statutes, I have illustrated and described the best form of my invention now known to me, it will be apparent to those skilled in the art that changes may be made in the form of the apparatus disclosed without departing from the spirit of my invention as set forth in the appended claims, and that in some cases certain features of my invention may sometimes be used to advantage without a corresponding use of other features.

Having now described my invention, what I claim as new and desire to secure by Letters Patent, is:

1. In a measuring instrument, the combination with a pointer moved to a position proportional to the value of a condition to be measured, a feeler moved from a predetermined position through a path terminated by engagement between said pointer and feeler, a cyclically operated relay mechanism including a drive lever moving through a predetermined path, a brake to stop movement of said lever at various points along said path, and means operated by said feeler including a secondary feeler positioned in accordance therewith and a part moving with said lever to engage the secondary feeler to apply said brake at a point proportional to the point at which the movement of the feeler is terminated.

2. In a measuring instrument, the combination with a pointer deflecting in accordance with the value of a condition to be measured, a feeler movable through a path normal to the path of deflection of said pointer from a predetermined position to a position limited by engagement with said pointer, a lever moved with said feeler, means to change the amount of movement of said lever relative to the movement of said feeler, relay mechanism including a drive lever normally movable through a path of predetermined length, and means moving with said drive lever and operated by said first lever to stop operation of said drive lever and relay mechanism at a point in said path proportionate to the position of said feeler.

3. In a measuring instrument the combination of a driven member, drive means selectively operated to drive said member in opposite directions, a part upon which said drive means are mounted, means to move said part through a path from a given point to a point depending upon the value of a variable condition, a brake to stop movement of said part, an element positioned in accordance with the value of a condition, means movable with said part and engageable with said element depending upon the position of the latter, and means operating upon the occurrence of said engagement to apply said brake.

4. In a measuring instrument, a lever positioned in proportion to the value of a condition to be measured, drive means comprising a driving mechanism and a driven member, said driving mechanism comprising a pair of driving parts, each adapted to drive said driven member in one direction, a power lever normally movable through a predetermined path, means operated by said power lever to move said driving parts, a member periodically engaging said first mentioned lever, means operated thereby to move one of said driving parts into engagement with said driven member, a brake to stop movement of said power lever, and means movable with said power lever and operated by engagement with said first lever to apply the brake and stop said power lever.

5. In a measuring instrument the combination of an element movable to either side of a neutral position depending upon the variation of a measurable condition from a given value, a feeler pivoted to move through a path transversely of said element to a position determined by engagement therewith, a pivoted lever connected to move with said feeler, a second lever biased to move in one direction, means to move said second lever in the opposite direction, and adjustable abutment means between said two levers whereby movement of one will move the other, to adjust said feeler.

6. In a measuring instrument, a driven member, driving means therefor comprising a driving member, a part normally moving therewith, a member having a brake surface located parallel to the path of movement of said driving member, a brake carried by said driving member adapted to engage said brake surface to terminate movement of said driving member, a lever variably positioned transversely of the path of movement of the part and adapted to be engaged by the same, and means operable upon engagement of said lever by said part to apply said brake surface.

7. In a measuring instrument, the combination with an element movable to a position corresponding to the value of a condition, means to periodically move said element, an operating member moved an amount proportional to the position of said element, and means to move said member comprising a drive part, a selective driving connection between said part and member, means operated in response to the position of said element to engage the driving connection between said part and member, means to move said part through a path from a predetermined point after said driving connection has been engaged, a brake for said part, and means to apply said brake to stop said part at points in the path of travel of the latter depending upon the position of said member.

8. In a measuring instrument, a driven member, drive means therefor comprising a lever pivoted to move around a point, parts on said lever adapted to engage said driven member, a brake pivoted to said lever and biased toward brake applying position, a member having a brake surface adapted to be engaged by said brake in any position of the latter, a second lever having a portion engaging said brake to hold the brake in inactive position and forwardly extending portion movable with said first lever, and variably positioned means in the path of said forwardly extending portion adapted to stop said second lever upon engagement therewith, continued movement of said first lever being stopped thereafter by the application of said brake to the brake surface.

ROY ULLMAN.